United States Patent
Kubota et al.

(10) Patent No.: US 11,534,829 B2
(45) Date of Patent: Dec. 27, 2022

(54) SINTERED FRICTION MATERIAL

(71) Applicants: NIPPON STEEL CORPORATION, Tokyo (JP); FINE SINTER CO., LTD., Kasugai (JP)

(72) Inventors: Manabu Kubota, Tokyo (JP); Naomitsu Mizui, Tokyo (JP); Fumio Ishimoto, Tokyo (JP); Kazutaka Asabe, Tokyo (JP); Osamu Kanda, Tokyo (JP); Satoru Nakano, Kasugai (JP); Takeshi Nakano, Kasugai (JP); Kazumichi Kawasaki, Kasugai (JP); Isao Shimazoe, Kasugai (JP)

(73) Assignees: NIPPON STEEL CORPORATION, Tokyo (JP); FINE SINTER CO., LTD., Kasugai (JP)

( * ) Notice: Subject to any disclaimer, the term of this patent is extended or adjusted under 35 U.S.C. 154(b) by 127 days.

(21) Appl. No.: 16/603,520

(22) PCT Filed: Apr. 7, 2017

(86) PCT No.: PCT/JP2017/014586
§ 371 (c)(1),
(2) Date: Oct. 7, 2019

(87) PCT Pub. No.: WO2018/185944
PCT Pub. Date: Oct. 11, 2018

(65) Prior Publication Data
US 2020/0038959 A1 Feb. 6, 2020

(51) Int. Cl.
*B22F 7/00* (2006.01)
*C22C 1/04* (2006.01)
(Continued)

(52) U.S. Cl.
CPC .............. *B22F 7/008* (2013.01); *B22F 1/10* (2022.01); *C22C 1/0425* (2013.01); *C22C 1/05* (2013.01);
(Continued)

(58) Field of Classification Search
CPC .... B22F 7/008; B22F 1/0059; B22F 2301/10; B22F 2301/15; B22F 2301/30;
(Continued)

(56) References Cited

U.S. PATENT DOCUMENTS 6,068,094 A 5/2000 Takahashi et al.

FOREIGN PATENT DOCUMENTS

CN 100519794 C 7/2009
CN 101493127 A 7/2009
(Continued)

OTHER PUBLICATIONS

Baranov et al. ("Effect of structure on the frictional behavior of a copper-titanium-carbide composite." Soviet Powder Metallurgy and Metal Ceramics 16.1 (1977): 28-30. (Year: 1977).*
(Continued)

*Primary Examiner* — Anthony J Zimmer
*Assistant Examiner* — Ricardo D Morales
(74) *Attorney, Agent, or Firm* — Birch, Stewart, Kolasch & Birch, LLP

(57) ABSTRACT

A sintered friction material is formed by pressure sintering mixed powder at 800° C. or above, the mixed powder consisting of, in mass %, Cu and/or Cu alloy: 40.0 to 80.0%, Ni: 0% or more and less than 5.0%, Sn: 0 to 10.0%, Zn: 0 to 10.0%, VC: 0.5 to 5.0%, Fe and/or Fe alloy: 2.0 to 40.0%, lubricant: 5.0 to 30.0%, metal oxide and/or metal nitride: 1.5 to 30.0%, and the balance being impurity.

4 Claims, 1 Drawing Sheet

(51) Int. Cl.
*C22C 1/05* (2006.01)
*F16D 69/02* (2006.01)
*B22F 1/10* (2022.01)

(52) U.S. Cl.
CPC .......... *F16D 69/02* (2013.01); *B22F 2301/10* (2013.01); *B22F 2301/15* (2013.01); *B22F 2301/30* (2013.01); *B22F 2301/35* (2013.01); *B22F 2302/105* (2013.01); *B22F 2302/20* (2013.01); *B22F 2302/205* (2013.01); *B22F 2302/256* (2013.01); *B22F 2302/40* (2013.01); *B22F 2302/45* (2013.01)

(58) Field of Classification Search
CPC ............ B22F 2301/35; B22F 2302/105; B22F 2302/20; B22F 2302/205; B22F 2302/256; B22F 2302/40; B22F 2302/45; C22C 1/0425; C22C 1/05; F16D 69/02
See application file for complete search history.

(56) References Cited

FOREIGN PATENT DOCUMENTS

| | | | |
|---|---|---|---|
| CN | 105063459 A | 11/2015 | |
| CN | 105240429 A | 1/2016 | |
| CN | 106011520 A | 10/2016 | |
| DE | 19712812 A1 | 10/1997 | |
| GB | 2355016 A * | 4/2001 | ........... B32B 15/013 |
| JP | S60106932 A | 6/1985 | |
| JP | 61-019750 A | 1/1986 | |
| JP | 62-080242 A | 4/1987 | |
| JP | S63109131 A | 5/1988 | |
| JP | H05179232 A | 7/1993 | |
| JP | 7-166278 A | 6/1995 | |
| JP | 08135703 A * | 5/1996 | |
| JP | H09222143 A | 8/1997 | |
| JP | 9-269026 A | 10/1997 | |
| JP | 2007-107067 A | 4/2007 | |
| WO | WO 2014/157089 A1 | 10/2014 | |
| WO | WO-2016190403 A1 * | 12/2016 | .............. B22F 7/062 |

OTHER PUBLICATIONS

WO2016190403A1 English translation (Year: 2016).*
JP-08135703-A English translation (Year: 1996).*
Office Action dated Aug. 2, 2018 for Taiwanese Patent Application 106111831.
Office Action dated Feb. 15, 2019 for Taiwanese Patent Application No. 106111931.
International Preliminary Report on Patentability and English Translation of Written Opinion of the International Searching Authority, dated Oct. 8, 2019 for PCT/JP2017/014586 (Forms PCT/IB/373 and PCT/ISA/237).
International Search Report, dated Jul. 4, 2017 for PCT/JP2017/014586 (Form PCT/ISA/210).
Susumu Usui; Sintered metal friction material; Bulletin of the Japan Institute of Metals; Mar. 14, 1983, vol. 22, No. 8, pp. 737-744.

* cited by examiner

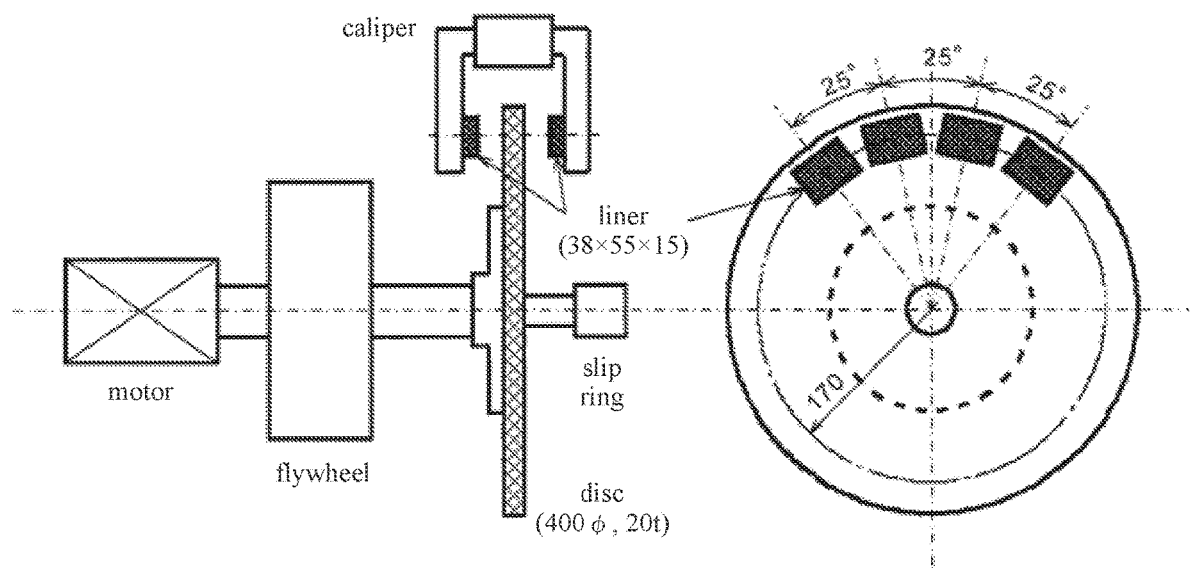

SINTERED FRICTION MATERIAL

TECHNICAL FIELD

The present invention relates to a sintered friction material, and particularly to a sintered friction material for railways.

Sintered friction materials, which are formed by sintering metal powder and granular material, are used for a brake lining and disc brake pads for railway vehicles. These sintered friction materials are required to have both excellent friction characteristics and excellent wear resistance.

For example, Patent Documents 1 and 2 disclose a sintered friction material which contains Cu, Sn or Zn, graphite, a lubricant, and an abrasive. Patent Documents 3 and 4 disclose a technique where carbide in Group 4a, 5a or 6a, which is extremely thermally stable, is caused to be contained as hard particle to scratch a disk surface, thus acquiring a high friction coefficient. Further, Patent Document 5 discloses a technique where WC is finely dispersed to increase high temperature strength of a Cu-based material, thus producing a sintered friction material having excellent fade resistance.

LIST OF PRIOR ART DOCUMENTS

Patent Document

Patent Document 1: JP60-106932A
Patent Document 2: JP63-109131A
Patent Document 3: JP05-179232A
Patent Document 4: JP09-222143A
Patent Document 5: JP2007-107067A

SUMMARY OF INVENTION

Technical Problem

The traveling speed of a high speed railway vehicle, such as Shinkansen in Japan, ICE (Intercity-Express) in Germany, and TGV (Train a Grande Vitesse) in France, includes a low speed range of from 0 to 70 km/h, an intermediate speed range of from more than 70 to 170 km/h, a high speed range of from more than 170 to 280 km/h, and an ultra high speed range of more than 280 km/h. Accordingly, a sintered friction material for railways is required to exhibit excellent friction characteristics and excellent wear resistance not only in the low speed range and the intermediate speed range, but also in the high speed range and the ultra high speed range.

In a brake friction material for railways, friction characteristics and wear resistance have a so-called trade-off relationship. In other words, attempting to enhance a friction coefficient in order to enhance friction characteristics causes the amount of wear of the friction material during braking to increase and hence, wear resistance deteriorates, thus shortening the lifespan of the friction material. As a result, frequency of replacement of the friction material increases, thus reducing the economic efficiency.

On the other hand, attempting to enhance wear resistance lowers the friction coefficient. Such lowering of the friction coefficient is not preferable in terms of safety. Accordingly, at present, sintered friction materials for railways have not been developed yet with both excellent friction characteristics and excellent wear resistance.

It is an objective of the present invention to solve the above-mentioned problems, and to provide a sintered friction material for railways which has comprehensively excellent properties, that is, which has both excellent friction characteristics and excellent wear resistance in a low speed range, an intermediate speed range, a high speed range, and an ultra high speed range of more than 280 km/h.

Solution to Problem

The present invention has been made to overcome the problems, and the gist of the present invention is the following sintered friction material.

(1) A sintered friction material formed by pressure sintering mixed powder at 800° C. or above, the mixed powder consisting of, in mass %:
Cu and/or Cu alloy: 40.0 to 80.0%;
Ni: 0% or more and less than 5.0%;
Sn: 0 to 10.0%;
Zn: 0 to 10.0%;
VC: 0.5 to 5.0%;
Fe and/or Fe alloy: 2.0 to 40.0%;
lubricant: 5.0 to 30.0%;
metal oxide and/or metal nitride: 1.5 to 30.0%; and
the balance being impurity.

(2) The sintered friction material described in the above (1), wherein
the lubricant contains one or more kinds selected from graphite: 5.0 to 15.0%,
hexagonal boron nitride: 3.0% or less,
molybdenum disulfide: 3.0% or less,
mica: 3.0% or less, and
one or more kinds selected from tungsten disulfide, iron sulfide, chromium sulfide, copper sulfide, and copper matte: 10.0% or less.

(3) The sintered friction material described in the above (1) or (2), wherein
the metal oxide and/or metal nitride includes one or more kinds selected from magnesia, zircon sand, silica, zirconia, mullite, and silicon nitride.

(4) The sintered friction material described in any one of the above (1) to (3), wherein
the Fe alloy includes one or more kinds selected from ferrochromium, ferrotungsten, ferromolybdenum, and stainless steel.

Advantageous Effects of Invention

According to the present invention, it is possible to acquire a sintered friction material for railways having both excellent friction characteristics and excellent wear resistance in a low speed range, an intermediate speed range, a high speed range, and an ultra high speed range of more than 280 km/h.

BRIEF DESCRIPTION OF DRAWINGS

FIG. 1 is a view for describing the summary of a bench tester used in a brake test.

DESCRIPTION OF EMBODIMENTS

Inventors of the present invention have conducted investigation and studies on friction characteristics and wear resistance not only in a low speed range, an intermediate speed range, and a high speed range, but also in an ultra high speed range of more than 280 km/h. In practice, a particularly important speed range is an intermediate speed range, a high speed range, and an ultra high speed range. Accordingly, the inventors of the present invention have made a comprehensive evaluation on friction characteristics and wear resistance in a speed range of from 160 to 365 km/h.

As a result, the inventors of the present invention have found the following. Mixed powder which contains mainly Cu as a matrix and the appropriate amount of vanadium carbide (hereinafter referred to as "VC") is sintered by a well-known pressure sintering method, thus forming a sintered friction material. The sintered friction material formed as described above has both excellent friction characteristics and excellent wear resistance in the above-mentioned speed ranges.

The sintered friction material according to the present invention is a sintered material. The structures (the thickness of neck, the bonding state of powder particles, the dispersion state of vacancy in the sintered material and the like) of this sintered material are determined depending on a sintering temperature during the pressure sintering. It is extremely difficult to specify these structures by the numerical limitation or the like using current measurement technique and analysis technique. Accordingly, the sintered friction material of the present invention includes the sintering temperature during pressure sintering as matters specifying the invention as described above.

Hereinafter, a sintered friction material according to the present invention is described in detail.

1. Chemical Composition

As described above, a sintered friction material of the present invention is used for a brake lining or disc brake pads for railway vehicles. Mixed powder forming a raw material of the sintered friction material contains the following composition (a matrix and a dispersant). The particle size of each particle of the mixed powder is not particularly limited. However, the particle size may be 1 to 1000 μm, for example. Hereinafter, "%" relating to the composition of mixed powder refers to "mass %".

1-1. Matrix (Base Material)

Cu and/or Cu Alloy: 40.0 to 80.0%

Copper (Cu) acts as a matrix (base material) of a sintered friction material. Cu has high thermal conductivity. Accordingly, Cu can suppress an increase in temperature of an interface between an object to be braked (a brake disc or the like) and the sintered friction material during braking (during friction) and hence, the occurrence of excessive seizure can be suppressed. Therefore, wear resistance of the sintered friction material increases.

When the total content of Cu and/or Cu alloy in the mixed powder is less than 40.0%, the above-mentioned advantageous effect cannot be obtained. On the other hand, when the total content exceeds 80.0%, the friction coefficient excessively increases. In this case, excessive friction is generated due to adhesion to the sliding surface of the object to be braked (the brake disc or the like, for example), thus lowering wear resistance of the sintered friction material.

Accordingly, the total content of Cu and/or Cu alloy is set to a value which falls within a range from 40.0 to 80.0%. The total content is preferably 50.0% or more, is more preferably 55.0% or more, and is further preferably 60.0% or more. Further, the total content is preferably 75.0% or less, is more preferably 70.0% or less, and is further preferably 67.0% or less.

Ni: 0% or More and Less than 5.0%

Nickel (Ni) is dissolved in Cu forming a base material, thus increasing the fusing point of the base material and hence, Nickel has the advantageous effect of increasing strength at a high temperature. Accordingly, Nickel may be contained when necessary. However, when Ni content is 5.0% or more, sinterability may be lowered. Accordingly, Ni content is set to less than 5.0%. Ni content is preferably 3.0% or less. When it is desired to obtain the above-mentioned advantageous effect, Ni content is preferably 0.5% or more.

Sn: 0 to 10.0%

Sn is a metal having a lower fusing point than Cu. Accordingly, causing a molten phase to appear in a heating step in sintering allows powders to be attracted to each other due to surface tension. As a result, the density of a sintered body increases, thus also increasing bending strength. Accordingly, Sn may be contained when necessary. However, excessively high Sn content causes heat resistance to deteriorate so that fade easily occurs. Accordingly, Sn content is set to 10.0% or less. Sn content is preferably 5.0% or less, and is more preferably 3.0% or less. When it is desired to obtain the above-mentioned advantageous effect, Sn content is preferably 0.3% or more, and is more preferably 0.5% or more.

Zn: 0 to 10.0%

Zn is a metal having a lower fusing point than Cu. Accordingly, causing a molten phase to appear in a heating step in sintering allows powders to be attracted to each other due to surface tension. As a result, the density of a sintered body increases, thus also increasing bending strength. Accordingly, Zn may be contained when necessary. However, excessively high Zn content causes heat resistance to deteriorate so that fade easily occurs. Accordingly, Zn content is set to 10.0% or less. Zn content is preferably 5.0% or less, and is more preferably 3.0% or less. When it is desired to obtain the above-mentioned advantageous effect, Zn content is preferably 0.3% or more, and is more preferably 0.5% or more.

In the case where Sn and Zn are contained in a combined manner, the total content of Sn and Zn is preferably less than 5.0%, and is preferably 4.0% or less.

1-2. Dispersant

VC: 0.5 to 5.0%

Vanadium carbide (VC) forms hard particles, and is contained in the matrix in the form of particle. Enhancement of properties brought about by containing VC includes both the advantageous effect of enhancing wear resistance and the advantageous effect of enhancing the friction coefficient. This is because VC scratches the sliding surface of the object to be braked (the brake disc or the like) as hard particles, thus removing an oxide film formed on the sliding surface and hence, VC has the advantageous effect of generating adhesion in a stable manner. At the same time, VC also acts as a lubricant, thus also having the advantageous effect of reducing the amount of wear of the friction material.

Due to such unique actions of VC, the following two advantageous effects can be obtained. In other words, (a) when VC is added to a friction material which has high friction coefficient, but which has wear resistance lower than VC, it is possible to obtain the advantageous effect of remarkably enhancing wear resistance. Further, (b) when VC is added to a friction material which has excellent wear resistance, but which has friction coefficient lower than VC, it is possible to obtain the advantageous effect of enhancing friction coefficient. Accordingly, adding VC can improve the balance between properties of the friction material. As a result, it is possible to acquire a friction material having both friction characteristics and wear resistance which conventionally have a trade-off relationship.

However, when VC content is excessively high, sinterability of the sintered friction material lowers so that wear resistance lowers. Accordingly, VC content is set to a value which falls within a range from 0.5 to 5.0%. VC content is preferably 0.6% or more, and is more preferably 1.0% or more. Further, VC content is preferably 3.0% or less, and is more preferably 2.5% or less.

Fe and/or Fe Alloy: 2.0 to 40.0%

Iron (Fe) and Fe alloy are contained in the matrix in the form of particle or agglomerate. Fe and Fe alloy increase strength of the matrix, thus enhancing wear resistance of the sintered friction material. Further, Fe and Fe alloy react with Fe in a disk by an effect that same kinds of metals easily adhere to each other due to high affinity. Consequently, adhesive friction is caused by the effect, and hence friction coefficient is increased. When the total content of Fe and/or Fe alloy in mixed powder is less than 2.0%, the above-mentioned advantageous effect cannot be obtained. On the other hand, when the total content exceeds 40.0%, not only excessive adhesion is easily generated, but also sinterability of the sintered friction material lowers, thus in fact lowering wear resistance.

Accordingly, the total content of Fe and/or Fe alloy is set to a value which falls within a range from 2.0 to 40.0%. The total content is preferably 5.0% or more, is more preferably 10.0% or more, and is further preferably 12.0% or more. Further, the total content is preferably 35.0% or less, is more preferably 30.0% or less, and is further preferably 25.0% or less.

When Fe content is excessively high, excessive adhesion is easily generated, thus in fact lowering wear resistance of a sintered friction material. Accordingly, content of Fe by itself is preferably 20.0% or less, is more preferably 15.0% or less, and is further preferably 12.0% or less.

The Fe alloy may be ferrochromium (FeCr), ferrotungsten (FeW), ferromolybdenum (FeMo), or stainless steel, for example. One or more kinds selected from ferrochromium (FeCr), ferrotungsten (FeW), ferromolybdenum (FeMo), and stainless steel may be contained. The total content of Fe alloy is preferably 20.0% or less, is more preferably 18.0% or less, and is further preferably 16.0% or less.

In this specification, ferrochromium includes one or more kinds of high carbon ferrochromium (FCrH0 to FCrH5), intermediate carbon ferrochromium (FCrM3, FCrM4), and low carbon ferrochromium (FCrL1 to FCrL4) specified in JIS G 2303 (1998).

Ferrotungsten means ferrotungsten (FW) having the chemical composition specified in JIS G 2306 (1998). Further, ferromolybdenum includes one or more kinds of high carbon ferromolybdenum (FMoH) and low carbon ferromolybdenum (FMoL) specified in JIS G 2307 (1998).

In this specification, stainless steel means alloy steel which contains 50 mass % or more of Fe and 10.5% or more of chromium, and more preferably means stainless steel specified in JIS G 4304 (2012). For example, the stainless steel may be martensitic stainless steel represented by SUS403 or SUS420 specified by the above-mentioned JIS standard, or ferritic stainless steel represented by SUS430. The stainless steel may be austenitic stainless steel represented by SUS304, SUS316, or SUS316L. The stainless steel may be austenitic-ferritic stainless steel represented by SUS329J1. The stainless steel may be precipitation hardening stainless steel represented by SUS630.

Lubricant: 5.0 to 30.0%

The sintered friction material of the present invention contains a lubricant. When content of the lubricant is less than 5.0%, the friction coefficient may not be sufficiently stabilized. On the other hand, when content of the lubricant exceeds 30.0%, sinterability deteriorates so that not only a sintered body may not obtain sufficient strength, but also wear resistance may deteriorate. Accordingly, content of the lubricant is set to a value which falls within a range from 5.0 to 30.0%.

It is preferable that the lubricant contain one or more kinds selected from graphite, hexagonal boron nitride, molybdenum disulfide, mica, tungsten disulfide, iron sulfide, chromium sulfide, copper sulfide, and copper matte. Particularly, it is preferable that the lubricant contain graphite within the following range. The reason is described.

Graphite: 5.0 to 15.0%

Graphite in this specification includes natural graphite and artificial graphite. In the sintered friction material which is subjected to pressure sintering, graphite is contained in the matrix in the form of particle. Graphite acts as a lubricant, thus stabilizing the friction coefficient hence leading to the reduction in the amount of wear of the sintered friction material. When graphite content is less than 5.0%, the above-mentioned advantageous effect may not be obtained. On the other hand, when graphite content exceeds 15.0%, there may be a case where mixed powder is not sufficiently sintered during pressure sintering and, as a result, wear resistance of the sintered friction material lowers. Accordingly, graphite content is preferably set to a value which falls within a range from 5.0 to 15.0%. Graphite content is preferably 8.0% or more, and is more preferably 9.0% or more. Further, graphite content is preferably 13.0% or less, and is more preferably 12.0% or less.

Further, the lubricant may contain one or more kinds selected from a group consisting of the following (a) to (d).

(a) hexagonal boron nitride: 3.0% or less
(b) molybdenum disulfide: 3.0% or less
(c) mica: 3.0% or less
(d) one or more kinds selected from tungsten disulfide, iron sulfide, chromium sulfide, copper sulfide, and copper matte: 10.0% or less All of hexagonal boron nitride (h-BN), molybdenum disulfide ($MoS_2$), mica, and one or more kinds selected from tungsten disulfide ($WS_2$), iron sulfide (FeS), chromium sulfide (CrS), copper sulfide ($Cu_2S$), and copper matte act as a lubricant. These lubricants stabilize the friction coefficient of the sintered friction material in the same manner as graphite. Accordingly, it is possible to obtain excellent friction characteristics.

However, when content of each of these lubricants is excessively high, sinterability of the sintered friction material lowers so that wear resistance lowers. Accordingly, content of hexagonal boron nitride is set to 3.0% or less. Content of molybdenum disulfide is set to 3.0% or less. Content of mica is set to 3.0% or less. The total content of one or more kinds selected from tungsten disulfide, iron sulfide, chromium sulfide, copper sulfide, and copper matte is set to 10.0% or less.

Copper matte is described in copper and copper-base alloy product terms, No. 5400 in JIS H 0500 (1998). Copper matte is mainly made of iron sulfide and copper sulfide. Each of iron sulfide and copper sulfide acts as a lubricant by itself. Further, iron sulfide and copper sulfide may be used as a mixture. The copper matte can be used as the mixture of iron sulfide and copper sulfide, and is inexpensive. Accordingly, using copper matte is advantageous in terms of economy.

Metal Oxide and/or Metal Nitride: 1.5 to 30.0%

Either of metal oxide and/or metal nitride acts as hard particles. In the sintered friction material which is subjected to pressure sintering, metal oxide and/or metal nitride are contained in the matrix as particles. Either of metal oxide and/or metal nitride scratches the sliding surface of an object to be braked (a brake disc or the like), thus removing an oxide film formed on the sliding surface hence leading to the generation of adhesion in a stable manner. Accordingly, it is possible to suppress lowering of the friction coefficient of the sintered friction material with respect to the object to be braked (the brake disc or the like) and hence, excellent friction characteristics can be acquired.

When the total content of metal oxide and/or metal nitride is less than 1.5%, excellent friction characteristics cannot be obtained. On the other hand, when the total content of metal oxide and/or metal nitride exceeds 30.0%, sinterability of the sintered friction material lowers. In this case, wear resistance of the sintered friction material lowers. Accordingly, the total content of metal oxide and/or metal nitride is set to a value which falls within a range from 1.5 to 30.0%. The total content is preferably 2.0% or more, and is more preferably 4.0% or more. Further, the total content is preferably 25.0% or less, is more preferably 20.0% or less, and is further preferably 15.0% or less.

Further, metal oxide and/or metal nitride may be magnesia ($MgO$), zircon sand ($ZrSiO_4$), silica ($SiO_2$), zirconia ($ZrO_2$), mullite ($3Al_2O_3 \cdot 2SiO_2$ to $2Al_2O_3 \cdot SiO_2$), or silicon nitride ($Si_3N_4$), for example. One or more kinds selected from magnesia ($MgO$), zircon sand ($ZrSiO_4$), silica ($SiO_2$), zirconia ($ZrO_2$), mullite ($3Al_2O_3 \cdot 2SiO_2$ to $2Al_2O_3 \cdot SiO_2$), and silicon nitride ($Si_3N_4$) may be contained.

The balance of mixed powder for the sintered friction material is impurity. In this embodiment, "impurity" means a component which is mixed into the mixed powder from raw materials, a production environment or the like in industrially producing the mixed powder, and which is allowed to be mixed without adversely affecting the sintered friction material of the present invention.

2. Sintered Friction Material

The sintered friction material according to the present invention is formed by pressure sintering the above-mentioned mixed powder at 800° C. or above. In the sintered friction material according to the present invention, the matrix containing Cu as a main component contains particularly VC. With such a configuration, the sintered friction material according to the present invention has both excellent friction characteristics and excellent wear resistance.

3. Production Method

The description is made with respect to one example of a method for producing the sintered friction material of the present invention. One example of the method for producing the sintered friction material of the present invention includes a mixed powder producing step, a molding step, and a pressure sintering step. The production method may further include a coining step and/or cutting step. Hereinafter, each step is described.

3-1. Mixed Powder Producing Step

Powder and granular materials for the matrix and dispersant are prepared. The prepared powder and granular material is mixed (is subjected to mixing) using a well-known mixer, thus producing mixed powder. The well-known mixer may be a ball mill or a V-type mixer, for example.

3-2. Molding Step

The produced mixed powder is molded into a predetermined shape, thus producing a green compact. In molding the mixed powder, a well-known molding method may be adopted. For example, the green compact is produced by the press molding method. To be more specific, a press tooling (die) is prepared for molding a predetermined shape. The mixed powder is charged into the press tooling. The powder and granular material charged into the press tooling is pressed by a press machine at a well-known pressure, thus being molded into a green compact. The pressure at the press machine may be 196 $N/mm^2$ or more, for example. It is sufficient to perform molding in the atmosphere.

3-3. Pressure Sintering Step

A well-known pressure sintering method is performed on the produced green compact, thus producing a sintered friction material. For example, the green compact is disposed on a graphite plate in a pressure sintering apparatus. Thereafter, in a casing frame with a high-frequency heating coil disposed on the inner peripheral surface of the casing frame, the graphite plates each of which has the green compact thereon are stored in a stacked manner. Then, the green compact is sintered at a predetermined sintering temperature in a sintering atmosphere while the green compact is pressurized by applying a pressure to the graphite plate at the uppermost stage.

The pressure sintering may be performed under well-known conditions. A sintering temperature during pressure sintering is set to 800° C. or above. The fusing point of copper is 1083° C. Accordingly, it is necessary to set the sintering temperature during pressure sintering to less than 1083° C. The preferable sintering temperature is between 800 and 1000° C. A pressure applied to the green compact during pressure sintering is between 0.2 and 2.0 $N/mm^2$, for example. A retention time at the sintering temperature during pressure sintering is between 60 and 120 minutes, for example. The atmosphere during pressure sintering may be an AX gas (ammonia decomposition gas, $N_2:H_2=1:3$), a gaseous mixture of an AX gas and a $N_2$ gas (gaseous mixture of 5 to 20% of $H_2$ gas and $N_2$ gas), an Ar gas or the like, for example.

Due to the pressure sintering, neck is formed at contact portions between powder and granular materials in the green compact, thus producing the sintered friction material.

3-4. Coining Step

The coining step may be performed after the pressure sintering step. In the coining step, the sintered friction material which is subjected to the pressure sintering step is cold pressed, thus shaping the sintered friction material.

3-5. Cutting Step

The cutting step may be performed after the pressure sintering step or after the coining step. In the cutting step, the sintered friction material is subjected to cutting, thus forming the sintered friction material into a desired shape.

Through the producing steps, the sintered friction material according to the present invention is produced. In the case where the sintered friction material forms a brake lining, one or a plurality of sintered friction materials are fixed to a mounting plate member, and the mounting plate member is mounted on a railway vehicle.

Hereinafter, the present invention is described more specifically with reference to examples. However, the present invention is not limited to these examples.

Example 1

Mixed powders each having the composition shown in Table 1 were produced. This example adopts a component design where importance is placed on friction characteristics.

TABLE 1

| | composition of mixed powder (mass %, balance, impurity) | | | | | | | | | | | |
|---|---|---|---|---|---|---|---|---|---|---|---|---|
| | Cu | artificial graphite | natural graphite | ferrochromium | ferrotungsten | SUS 316L | ZrSiO$_2$ | SiO$_2$ | mullite | Si$_3$N$_4$ | mica | BN | VC |
| D1 | 63.30 | 5.44 | 6.16 | 7.50 | 10.90 | — | 4.40 | 1.60 | — | — | — | 0.70 | — |
| D2 | 62.06 | 5.33 | 6.04 | 7.35 | 10.69 | — | 4.31 | 1.57 | — | — | — | 0.69 | 1.96 |
| D3 | 62.50 | 5.37 | 6.08 | 7.41 | 10.76 | — | 4.34 | 1.58 | — | — | — | — | 1.96 |

To be more specific, a raw material was charged into a V-type mixer and, thereafter, was subjected to mixing for 20 to 100 minutes at a rotational speed of 20 to 40 rpm, thus producing each mixed powder. Then, a green compact was produced by molding using each mixed powder. In the molding, the mixed powder was charged into a press tooling made of hard metal and, thereafter, was pressurized at approximately 343 N/mm$^2$, thus being molded into a green compact.

The green compact was pressure sintered by a pressure sintering method, thus forming each sintered friction material. To be more specific, the green compact was disposed on a graphite plate. Thereafter, in a casing frame with a high-frequency heating coil disposed on the inner peripheral surface of the casing frame, the graphite plates each of which had the green compact thereon were stored in a stacked manner. Then, the green compact was heated for 60 minutes at 950° C., and was pressurized at 1.0 N/mm$^2$, thus sintering the green compact to produce a sintered friction material. The atmosphere in the frame during pressure sintering was a gaseous mixture of an AX gas and a N$_2$ gas (5% of H$_2$ gas, the balance: a gaseous mixture including N$_2$ gas). Each sintered friction material was produced through the producing steps.

[Brake Test]

A brake test was performed using the produced sintered friction materials. A bench tester shown in FIG. 1 was used in the brake test. The bench tester includes a brake disc, a flywheel, a motor, and a caliper. The brake disc is connected to the flywheel and the motor by way of a shaft. A material used for forming the brake disc is SCM440 steel. The brake disc is caused to have tensile strength of 1000 MPa by quenching and tempering the SCM440 steel. The brake disc has a size of approximately ½ of the brake disc used for Shinkansen. The brake disc has the diameter of 400 mm, and the thickness of 20 mm.

Four sintered friction materials (liners) were mounted on a mounting plate. Two mounting plates were prepared each of which has the four sintered friction materials thereon. Then, the two mounting plates were respectively mounted on left and right inner surfaces of the caliper. Each sintered friction material has a rectangular parallelepiped shape, and has the width of 38 mm, the length of 55 mm, and the height of 15 mm. The four sintered friction materials are arranged on an imaginary circle centered on the center of the brake disc and having a radius of 170 mm such that the sintered friction materials are arranged in one row while being separated at 25° intervals about the center axis of the brake disc.

[Measurement of Friction Coefficient in Brake Test]

Thereafter, a brake test was performed. To be more specific, the sintered friction materials, mounted on the left and right inner surfaces of the caliper, were pressed (by applying braking) against both surfaces of the rotating brake disc at a fixed pressure of 2.24 kN, and a torque was measured to acquire the friction coefficient. The speed of the disc brake at the time of starting to apply braking (braking initial speed) was set to 160, 240, 300, 325, and 365 km/h, and a friction coefficient at each braking initial speed was acquired. Braking was applied three times at each braking initial speed so as to acquire a friction coefficient. An average value of three friction coefficients was defined as an average friction coefficient at the braking initial speed. A friction material having a higher average friction coefficient has greater friction characteristics.

[Amount of Wear in Brake Test]

A mass difference of the sintered friction material between before and after the brake test at each braking initial speed was acquired. From the acquired mass difference, the average amount of wear (g/one surface) of the sintered friction materials per one surface of the brake disc per brake test was acquired. To be more specific, in a state where the sintered friction materials are mounted on the mounting plate, the entire mass of each mounting plate was measured before the test. Braking was performed three times and, thereafter, the entire mass of each mounting plate was measured in the same state. The mass difference was acquired between before and after the brake on a set of mounting plates basis. Then, the mass differences of two sets of the mounting plates consisting of the left and right mounting plates were summed. Thereafter, the summed value was divided by three, which is the number of times braking was applied, and, further, was divided by two, which is the number of sets of the mounting plates. The value acquired as described above was defined as the average amount of wear (g/one surface·time) at the braking speed. A friction material having a lower average amount of wear has greater wear resistance.

[Test Result]

Test results of marks D1 to D3 are shown in Table 2. To perform comprehensive evaluation with respect to friction characteristics and wear resistance at 160 to 365 km/h, Table 2 also shows values each acquired by calculating the average value of measured values at each speed of 160, 240, 300, 325, and 365 km/h.

TABLE 2

| | average friction coefficient | | | | | | | average amount of wear (g/one surface × time) | | | | | | | |
|---|---|---|---|---|---|---|---|---|---|---|---|---|---|---|---|
| | 160 km/h | 240 km/h | 300 km/h | 325 km/h | 365 km/h | average | difference with Comparative Example | 160 km/h | 240 km/h | 300 km/h | 325 km/h | 365 km/h | average | difference with Comparative Example | |
| D1 | 0.50 | 0.48 | 0.45 | 0.43 | 0.36 | 0.444 | — | 2.00 | 5.12 | 13.12 | 12.13 | 10.47 | 8.568 | — | Comparative example |
| D2 | 0.48 | 0.46 | 0.38 | 0.35 | 0.31 | 0.396 | −0.048 | 0.85 | 1.58 | 2.77 | 4.38 | 8.00 | 3.516 | −5.052 | Inventive example |
| D3 | 0.53 | 0.44 | 0.36 | 0.35 | 0.33 | 0.402 | −0.042 | 1.45 | 1.55 | 3.17 | 5.00 | 9.72 | 4.178 | −4.390 | Inventive example |

The friction coefficient and the amount of wear of a sintered friction material largely depend on component and production conditions and hence, it is necessary to evaluate the advantageous effect of the present invention based on a difference relative to a reference material. In the evaluation of friction characteristics, it is determined that the advantageous effect of enhancing friction characteristics is achieved when the average friction coefficient increases by 0.01 or more compared with the Comparative Example forming the reference. Also even in the case where the average friction coefficient slightly increases or reduces, it is determined that there is in practice no problem when the values of average friction coefficient at all braking speeds are 0.30 or more.

In the evaluation of wear resistance, it is determined that the advantageous effect of enhancing wear resistance is achieved when the average amount of wear reduces by 1.0 g/one surface·time or more compared with the Comparative Example forming a reference. Further, variation occurs relatively easily in the measurement results of the average amount of wear. Accordingly, in the case where the average amount of wear both increases and decreases, when the variation amount of the average amount of wear is less than 1.0 g/one surface·time, such variation falls within an allowable error and hence, it is determined that there is no variation.

Referring to Table 2, in D1 of the Comparative Example, the average amount of wear is 8.568 (g/one surface·time). On the other hand, in either of D2 or D3 to which VC is added, the average amount of wear of the friction material greatly reduces so that wear resistance is significantly improved. The average friction coefficient is slightly lowered due to the addition of VC. However, the average friction coefficient is significantly greater than 0.30 at all braking speeds and hence, it is determined that there is in practice no problem. In view of the above, adding VC allows the friction material to have comprehensively excellent properties.

Example 2

To systematically evaluate an influence of VC content, investigation was further conducted. Mixed powders each having the composition shown in Table 3 were produced. In the same manner as the example 1, this example also adopts a component design where importance is placed on friction characteristics.

TABLE 3

| | composition of mixed powder (mass %, balance, impurity) | | | | | | | | | | | |
|---|---|---|---|---|---|---|---|---|---|---|---|---|
| | Cu | artificial graphite | natural graphite | ferrochromium | ferrotungsten | SUS 316L | ZrSiO$_2$ | SiO$_2$ | mullite | Si$_3$N$_4$ | mica | BN | VC |
| E1 | 65.30 | 12.00 | 0.50 | 5.00 | 10.00 | — | 5.00 | 1.50 | — | — | — | 0.70 | — |
| E2 | 64.03 | 11.76 | 0.49 | 4.90 | 9.80 | — | 4.90 | 1.47 | — | — | — | 0.69 | 1.96 |
| E3 | 63.40 | 11.65 | 0.49 | 4.85 | 9.71 | — | 4.85 | 1.46 | — | — | — | 0.68 | 2.91 |
| E4 | 62.78 | 11.54 | 0.48 | 4.81 | 9.62 | — | 4.81 | 1.44 | — | — | — | 0.67 | 3.85 |

Production conditions of a sintered friction material, the evaluation method and evaluation criterion of friction characteristics and wear resistance are equal to those in the example 1. Test results of marks E1 to E4 are shown in Table 4.

TABLE 4

| | average friction coefficient | | | | | | | average amount of wear (g/one surface × time) | | | | | | | |
|---|---|---|---|---|---|---|---|---|---|---|---|---|---|---|---|
| | 160 km/h | 240 km/h | 300 km/h | 325 km/h | 365 km/h | average | difference with Comparative Example | 160 km/h | 240 km/h | 300 km/h | 325 km/h | 365 km/h | average | difference with Comparative Example | |
| E1 | 0.55 | 0.52 | 0.47 | 0.42 | 0.38 | 0.468 | — | 1.42 | 2.97 | 4.73 | 3.80 | 5.83 | 3.750 | — | Comparative example |
| E2 | 0.55 | 0.52 | 0.46 | 0.43 | 0.39 | 0.470 | 0.002 | 0.33 | 0.73 | 2.18 | 3.13 | 4.60 | 2.194 | −1.556 | Inventive example |
| E3 | 0.50 | 0.50 | 0.46 | 0.46 | 0.39 | 0.462 | −0.006 | 0.53 | 1.05 | 2.22 | 3.02 | 4.73 | 2.310 | −1.440 | Inventive example |
| E4 | 0.51 | 0.47 | 0.43 | 0.41 | 0.35 | 0.434 | −0.034 | 0.32 | 0.83 | 2.30 | 3.53 | 5.37 | 2.470 | −1.280 | Inventive example |

Referring to Table 4, in E1 of the Comparative Example, the average amount of wear is 3.750 (g/one surface·time). On the other hand, in each of E2 to E4 to which VC is added, the average amount of wear of the friction material clearly reduces so that wear resistance is improved. In some of E2 to E4, the average friction coefficient is slightly lowered due to the addition of VC. However, the average friction coefficient is significantly greater than 0.30 at all braking speeds and hence, it is determined that there is in practice no problem. In view of the above, adding VC allows the friction material to have comprehensively excellent properties.

Example 3

Mixed powders each having the composition shown in Table 5 were produced. This example adopts a component design where importance is placed on wear resistance.

TABLE 5

| | | composition of mixed powder (mass %, balance, impurity) | | | | | | | | | | | |
|---|---|---|---|---|---|---|---|---|---|---|---|---|---|
| | Cu | artificial graphite | natural graphite | ferrochromium | ferrotungsten | SUS 316L | $ZrSiO_2$ | $SiO_2$ | mullite | $Si_3N_4$ | mica | BN | VC |
| F1 | 62.00 | 11.00 | 0.50 | 5.40 | 5.40 | 5.40 | 7.00 | 1.50 | 1.80 | — | — | — | — |
| F2 | 60.78 | 10.78 | 0.49 | 5.30 | 5.30 | 5.30 | 6.86 | 1.47 | 1.76 | — | — | — | 1.96 |
| F3 | 62.00 | 11.00 | — | 5.40 | 5.40 | 5.40 | 3.50 | 1.50 | 1.80 | 3.50 | 0.50 | — | — |
| F4 | 60.78 | 10.78 | — | 5.30 | 5.30 | 5.30 | 3.43 | 1.47 | 1.76 | 3.43 | 0.49 | — | 1.96 |

Production conditions of a sintered friction material, and the evaluation method and evaluation criterion of friction characteristics and wear resistance are equal to those in the example 1. Test results of marks F1 to F4 are shown in Table 6.

TABLE 6

| | average friction coefficient | | | | | | | average amount of wear (g/one surface × time) | | | | | | | |
|---|---|---|---|---|---|---|---|---|---|---|---|---|---|---|---|
| | 160 km/h | 240 km/h | 300 km/h | 325 km/h | 365 km/h | average | difference with Comparative Example | 160 km/h | 240 km/h | 300 km/h | 325 km/h | 365 km/h | average | difference with Comparative Example | |
| F1 | 0.45 | 0.39 | 0.36 | 0.34 | 0.33 | 0.374 | — | 0.40 | 0.92 | 2.53 | 3.55 | 7.00 | 2.880 | — | Comparative Example |
| F2 | 0.45 | 0.41 | 0.37 | 0.36 | 0.34 | 0.386 | 0.012 | 0.32 | 0.82 | 2.62 | 3.58 | 6.50 | 2.768 | −0.112 | Inventive example |
| F3 | 0.43 | 0.42 | 0.35 | 0.31 | 0.32 | 0.366 | — | 0.30 | 0.48 | 1.93 | 2.30 | 4.27 | 1.856 | — | Comparative example |
| F4 | 0.49 | 0.39 | 0.34 | 0.34 | 0.33 | 0.378 | 0.012 | 0.22 | 0.75 | 1.68 | 2.42 | 4.87 | 1.988 | 0.132 | Inventive example |

F2 is obtained by adding VC to F1 of the Comparative Example. F4 is obtained by adding VC to F3 of the Comparative Example. Referring to Table 6, in either of F2 or F4, the average friction coefficient increases so that friction characteristics are improved. On the other hand, the amount of variation in the average amount of wear is small, and there is no variation in wear resistance which was originally a favorable value. In view of the above, adding VC allows the friction material to have comprehensively excellent properties.

Example 4

To systematically evaluate an influence of VC content, investigation was further conducted. Mixed powders each having the composition shown in Table 7 were produced. In the same manner as example 3, this example also adopts a component design where importance is placed on wear resistance.

TABLE 7

| | | composition of mixed powder (mass %, balance, impurity) | | | | | | | | | | | |
|---|---|---|---|---|---|---|---|---|---|---|---|---|---|
| | Cu | artificial graphite | natural graphite | ferrochromium | ferrotungsten | SUS 316L | $ZrSiO_2$ | $SiO_2$ | mullite | $Si_3N_4$ | mica | BN | VC |
| G1 | 62.00 | 11.00 | 0.50 | 5.40 | 5.40 | 5.40 | 7.00 | 1.50 | 1.80 | — | — | — | — |
| G2 | 61.69 | 10.94 | 0.50 | 5.37 | 5.37 | 5.37 | 6.97 | 1.49 | 1.79 | — | — | — | 0.50 |
| G3 | 61.39 | 10.90 | 0.50 | 5.35 | 5.35 | 5.35 | 6.93 | 1.49 | 1.78 | — | — | — | 0.99 |
| G4 | 61.08 | 10.84 | 0.49 | 5.32 | 5.32 | 5.32 | 6.90 | 1.48 | 1.77 | — | — | — | 1.48 |

TABLE 7-continued

| | composition of mixed powder (mass %, balance, impurity) | | | | | | | | | | | |
|---|---|---|---|---|---|---|---|---|---|---|---|---|
| | Cu | artificial graphite | natural graphite | ferrochromium | ferrotungsten | SUS 316L | $ZrSiO_2$ | $SiO_2$ | mullite | $Si_3N_4$ | mica | BN | VC |
| G5 | 60.78 | 10.78 | 0.49 | 5.30 | 5.30 | 5.30 | 6.86 | 1.47 | 1.76 | — | — | — | 1.96 |
| G6 | 60.49 | 10.74 | 0.49 | 5.27 | 5.27 | 5.27 | 6.83 | 1.46 | 1.76 | — | — | — | 2.44 |

Production conditions of a sintered friction material, the evaluation method and evaluation criterion of friction characteristics and wear resistance are equal to those in the example 1. Test results of marks G1 to G6 are shown in Table 8.

TABLE 8

| | average friction coefficient | | | | | | | average amount of wear (g/one surface × time) | | | | | | | |
|---|---|---|---|---|---|---|---|---|---|---|---|---|---|---|---|
| | 160 km/h | 240 km/h | 300 km/h | 325 km/h | 365 km/h | average | difference with Comparative Example | 160 km/h | 240 km/h | 300 km/h | 325 km/h | 365 km/h | average | difference with Comparative Example | |
| G1 | 0.46 | 0.39 | 0.36 | 0.34 | 0.33 | 0.376 | — | 0.40 | 0.92 | 2.53 | 3.55 | 7.00 | 2.880 | — | Comparative example |
| G2 | 0.54 | 0.47 | 0.40 | 0.39 | 0.36 | 0.432 | 0.056 | 0.43 | 1.40 | 3.00 | 3.98 | 6.92 | 3.146 | 0.266 | Inventive example |
| G3 | 0.47 | 0.45 | 0.39 | 0.39 | 0.34 | 0.408 | 0.032 | 0.43 | 1.12 | 2.53 | 3.72 | 7.53 | 3.066 | 0.186 | Inventive example |
| G4 | 0.51 | 0.45 | 0.41 | 0.39 | 0.37 | 0.426 | 0.050 | 0.48 | 0.98 | 2.60 | 3.68 | 6.65 | 2.878 | −0.002 | Inventive example |
| G5 | 0.45 | 0.42 | 0.37 | 0.36 | 0.34 | 0.388 | 0.012 | 0.32 | 0.82 | 2.62 | 3.58 | 6.50 | 2.768 | −0.112 | Inventive example |
| G6 | 0.46 | 0.42 | 0.38 | 0.35 | 0.34 | 0.390 | 0.014 | 0.33 | 0.92 | 2.70 | 3.63 | 7.07 | 2.930 | 0.050 | Inventive example |

Each of G2 to G6 is obtained by adding VC to G1 of the Comparative Example. Referring to Table 8, in each of G2 to G6, the average friction coefficient increases so that friction characteristics are improved. On the other hand, the amount of variation in the average amount of wear is small, and there is no variation in wear resistance where the average amount of wear was originally a favorable value of 2.880 (g/one surface·time). In view of the above, adding VC allows the friction material to have comprehensively excellent properties.

INDUSTRIAL APPLICABILITY

According to the present invention, it is possible to acquire a sintered friction material for railways having both excellent friction characteristics and excellent wear resistance in a low speed range, an intermediate speed range, a high speed range, and an ultra high speed range of more than 280 km/h.

The invention claimed is:

1. A sintered friction material formed by pressure sintering mixed powder at 800° C. or above, the mixed powder consisting of, in mass %:
   Cu and/or Cu alloy: 40.0 to 80.0%;
   Ni: 0% or more and less than 5.0%;
   Sn: 0 to 10.0%;
   Zn: 0 to 10.0%;
   VC: 0.5 to 5.0%;
   Fe alloy and optionally Fe: 2.0 to 40.0%;
   lubricant: 5.0 to 30.0%;
   metal oxide and/or metal nitride: 1.5 to 30.0%; and
   the balance being impurity, wherein
   the Fe alloy includes stainless steel,
   wherein the metal oxide and/or metal nitride includes one or more kinds selected from zircon sand, silica, mullite, and silicon nitride.

2. The sintered friction material according to claim 1, wherein
   the lubricant contains one or more kinds selected from
   graphite: 5.0 to 15.0%,
   hexagonal boron nitride: 3.0% or less,
   molybdenum disulfide: 3.0% or less,
   mica: 3.0% or less, and
   one or more kinds selected from tungsten disulfide, iron sulfide, chromium sulfide, copper sulfide, and copper matte: 10.0% or less.

3. The sintered friction material according to claim 1, wherein
   the Fe alloy includes one or more kinds selected from ferrochromium, ferrotungsten, and ferromolybdenum.

4. The sintered friction material according to claim 2, wherein
   the Fe alloy includes one or more kinds selected from ferrochromium, ferrotungsten, and ferromolybdenum.

* * * * *